United States Patent [19]
Patino et al.

[11] Patent Number: 5,969,508
[45] Date of Patent: Oct. 19, 1999

[54] BATTERY CHARGING METHOD USING BATTERY CIRCUITRY IMPEDENCE MEASUREMENT TO DETERMINE OPTIMUM CHARGING VOLTAGE

[75] Inventors: Joseph Patino, Pembroke Pines, Fla.; Michael D. Geren, Suwanee, Ga.; Barbara R. Doutre, Plantation, Fla.

[73] Assignee: Motorola, Inc., Schaumburg, Ill.

[21] Appl. No.: 09/122,707

[22] Filed: Jul. 27, 1998

[51] Int. Cl.$^6$ ..................................................... H02N 7/00
[52] U.S. Cl. ........................... 320/153; 320/144; 324/430
[58] Field of Search .................. 320/144, 151, 320/152, 153, 160; 324/430

[56] References Cited

U.S. PATENT DOCUMENTS

| | | | |
|---|---|---|---|
| 5,646,508 | 7/1997 | Van Phouc et al. | 320/152 |
| 5,684,387 | 11/1997 | Patino | 320/30 |
| 5,905,358 | 5/1999 | Fernandez et al. | 320/106 |
| 5,912,547 | 6/1999 | Grabon | 320/150 |

*Primary Examiner*—Peter S. Wong
*Assistant Examiner*—Gregory Toatley, Jr.
*Attorney, Agent, or Firm*—Barbara R. Doutre

[57] ABSTRACT

A charging technique (200) charges a battery pack (102) by taking into account the additional internal circuit impedance of the battery pack. An optimum pack voltage value for the battery pack is calculated (208) based on the rated internal cell voltage as well as the charge current and the internal battery pack circuitry impedance. The battery pack can now be charged such that the internal battery cell voltage is maintained at the rated voltage throughout the charging process. The optimum pack voltage is also updated (220) to account for variations in the battery pack circuitry impedance over temperature (216, 218) as well as variations in charge current (222, 224) during the charging process.

10 Claims, 10 Drawing Sheets

BATTERY CHARGING METHOD USING BATTERY CIRCUITRY IMPEDENCE MEASUREMENT TO DETERMINE OPTIMUM CHARGING VOLTAGE

TECHNICAL FIELD

This invention relates to battery charging methods and more specifically to battery charging methods for lithium batteries.

BACKGROUND

Lithium battery cells have become increasingly popular for use in electronic products. Lithium ion and lithium polymer technologies are particularly useful for powering small portable electronic products, such as radios, because of their lightweight and high energy density characteristics. Unfortunately, lithium cells tend to take longer to fully charge. For example, a 3.6 volt nominal, lithium ion cell being charged at a rate of 1 C takes approximately two and a half hours to fully charge as compared to a 1.2 volt nominal nickel metal hydride cell which takes approximately one hour to reach 90 percent capacity. Customers of rechargeable portable electronic products would prefer to have the advantages of both a lightweight product and a reduced charge time.

Hence, it would be advantageous to have a charge system which would reduce the charge time of a lithium battery.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Figure 1:
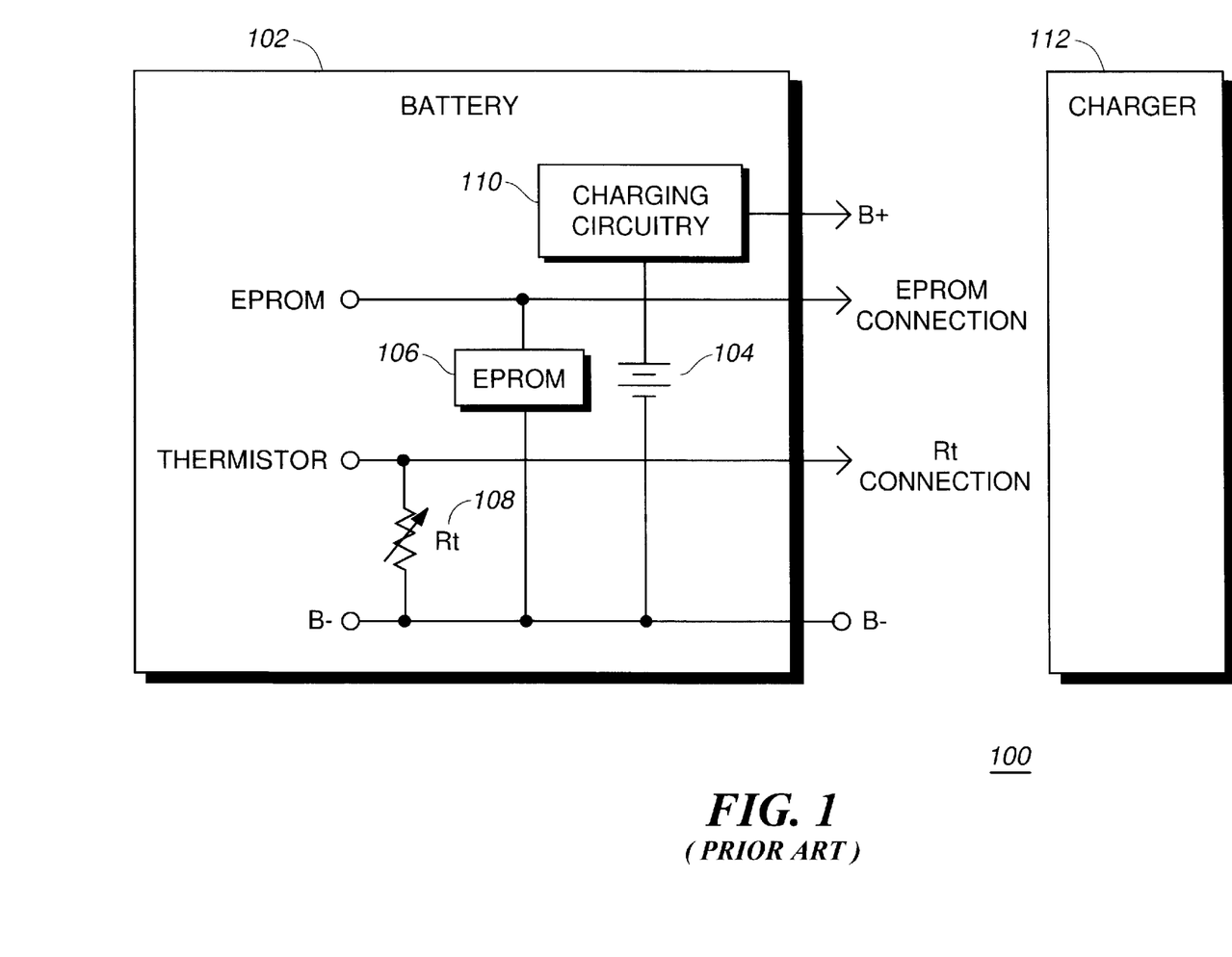
FIG. 1 a typical battery charging system.

Referring now to FIG. 1, there is shown a prior art charging system 100. System 100 includes a battery pack 102 and charger 112. Included within the battery pack 102 are internal battery cells 104, an EPROM 106, thermistor 108, as well as other possible charge circuitry 110 such as a flex circuit, FETs, and polyswitches. A typical lithium ion charging routine determines the voltage at which to charge the cell(s) 104 by reading the EPROM 106. One problem with existing lithium charge routines is that when the battery pack 102 is charged to the internal battery cells' rated voltage threshold, the extra impedances in the battery pack, caused by the charge circuitry 110, lower the effective voltage at which the internal cell 104 is being charged. The charging routine to be described herein compensates the voltage threshold to charge the entire battery pack 102 by taking into account the impedance of the charge circuitry 110 so that the battery pack can be charged to an optimized battery pack voltage.

Figure 2:
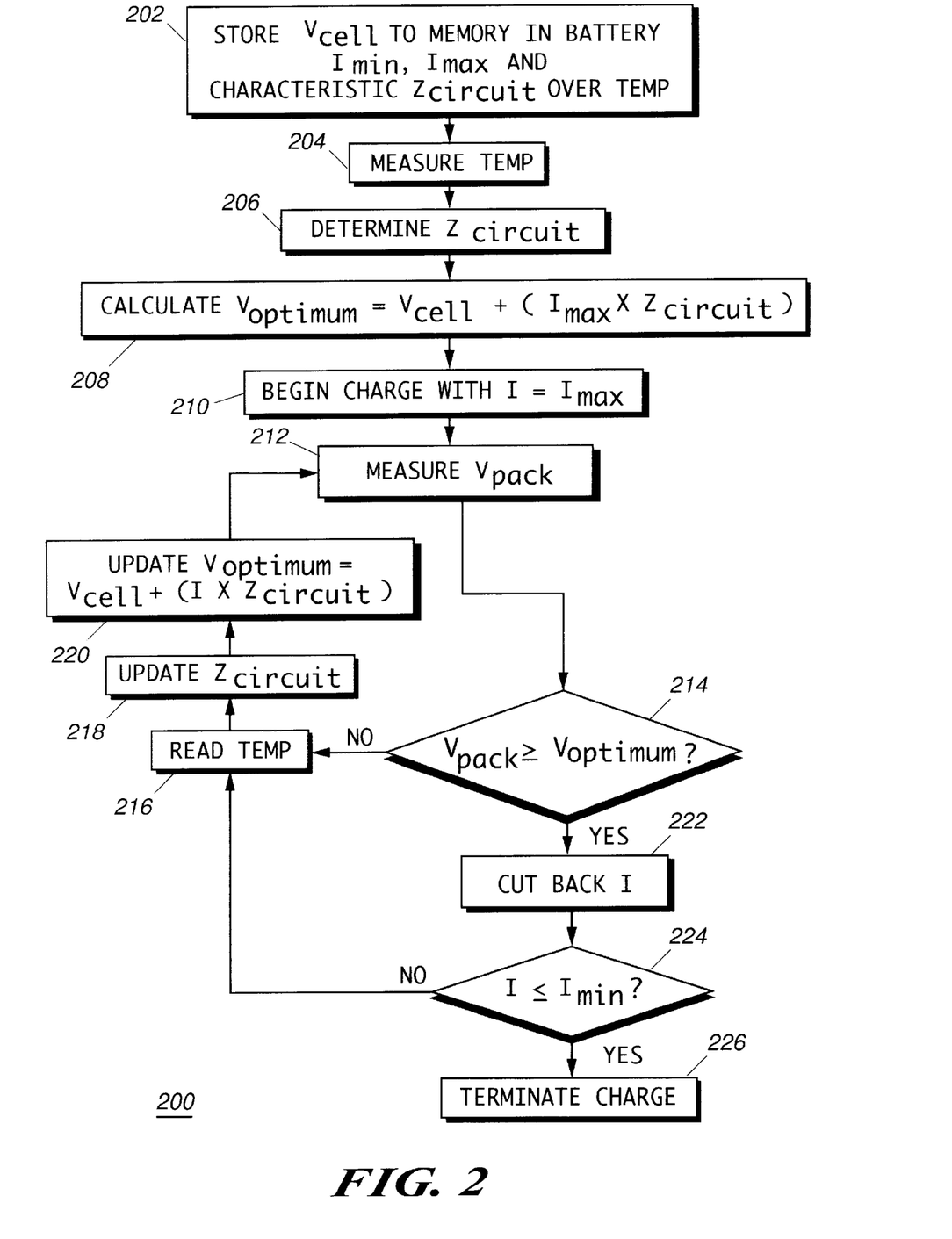
FIG. 2 is a flowchart of a charging method in accordance with the present invention.

Referring now to FIG. 2, there is shown a flowchart representing a battery charging method 200 in accordance with the present invention. Briefly, by compensating the voltage threshold to charge the entire battery pack by the product of the charge current and additional circuit impedance, the battery pack can now be charged such that the internal battery cell voltage is maintained at the rated voltage. The net effect is that the internal cell can now be charged to its rated voltage and also that the cell can now be charged faster.

The charging method begins at step 202 by storing the rated cell voltage value (Vcell) and the rated minimum and maximum charge current values (Imin, Imax), and characteristic battery circuitry impedance information versus temperature for a given battery type into the memory, such as an EPROM, of the battery. The battery pack temperature is measured by the charger at step 204. The battery pack circuitry impedance is determined by the charger at step 206 based on the measured temperature and the stored impedance characteristics of step 202. This battery pack circuit impedance includes, but is not limited to, such circuitry as the flex, FETs, polyswitch, and any other associated impedances in the charge path but does not include the battery's internal cell impedance.

Next, an optimum pack voltage threshold is determined at step 208 with the following calculation:

$$Voptimum = Vcell + (Imax \times Zcircuit),$$

where Vcell is the rated internal cell voltage, Imax is the maximum rated charge current, and Zcircuit is the battery pack circuitry impedance determined in step 206.

Step 210 proceeds to begin charging the battery with current (I) initially set to the maximum rated charge current (Imax). At step 212 the charger measures the battery pack voltage (across B+/B− terminals). At step 214, the measured battery pack voltage is compared to the calculated optimum pack voltage. If the measured pack voltage is less than the calculated optimum pack voltage at step 214, then charge routine re-measures the temperature of the battery pack at step 216 (read temp) and updates the battery pack circuit impedance value (Zcircuit) at step 218, and then updates the optimum battery pack voltage at step 220 using the updated Zcircuit value. The charge routine returns to step 212 and repeats the sequence of steps 212 through 220 until the measured battery pack voltage meets or exceeds the continuously updated optimized battery pack voltage at step 214.

Once the voltage threshold has been reached at step 214, the charge current begins to cut back by a predetermined amount at step 222. At step 224 the reduced charge current is compared to a minimum threshold, preferably the minimum charge current stored in the battery (Imin). If the charge current is greater than the minimum charge threshold then the routine returns back to the step of re-measuring the temperature at step 216 to repeat the sequence of updating the battery circuit impedance and further updating the optimum pack voltage, this time with the reduced charge current. Thus, the optimum pack voltage value is adapted to compensate not only for variations in the battery circuitry impedance caused by temperature, but also to the variations in the charge current as the charge current is being cut back. Once the charge current reaches the minimum threshold at step 224 the charging routing is terminated at step 226.

As an example, a lithium battery pack having an average capacity of 950 mAH with a rated charge current (Icharge) of 1 Amp, and a rated internal cell voltage (Vcell) of 4.2 volts might include battery charge circuitry including a flex impedance of 72 milliohms, a FET impedance of 52 milliohms, and a polyswitch impedance of 45 milliohms. Therefore:

$$Zcircuit = 75 + 52 + 45 = 172 \text{ milliohms,}$$

$$Voptimum = 4.2 \text{ V} + (1.0 \text{ A}) \times (172 \text{ m}\Omega) = 4.372 \text{ V}$$

The battery pack will continue to be charged with the rated charge and the optimum pack voltage is updated to compensate for variations in Zcircuit over temperature. Once the measured pack voltage exceeds the updated optimum pack voltage, the current will begin and continue to cut back. Again, the optimum pack voltage value is updated to compensate for impedance variations caused by temperature as well as lower current. Once the minimum charge current threshold is reached the charge is terminated. The charging routine described by the invention allows the internal cells themselves to be substantially closer to the rated 4.2 volts without being overcharged as well as achieving a reduced charge time.

Figure 3:
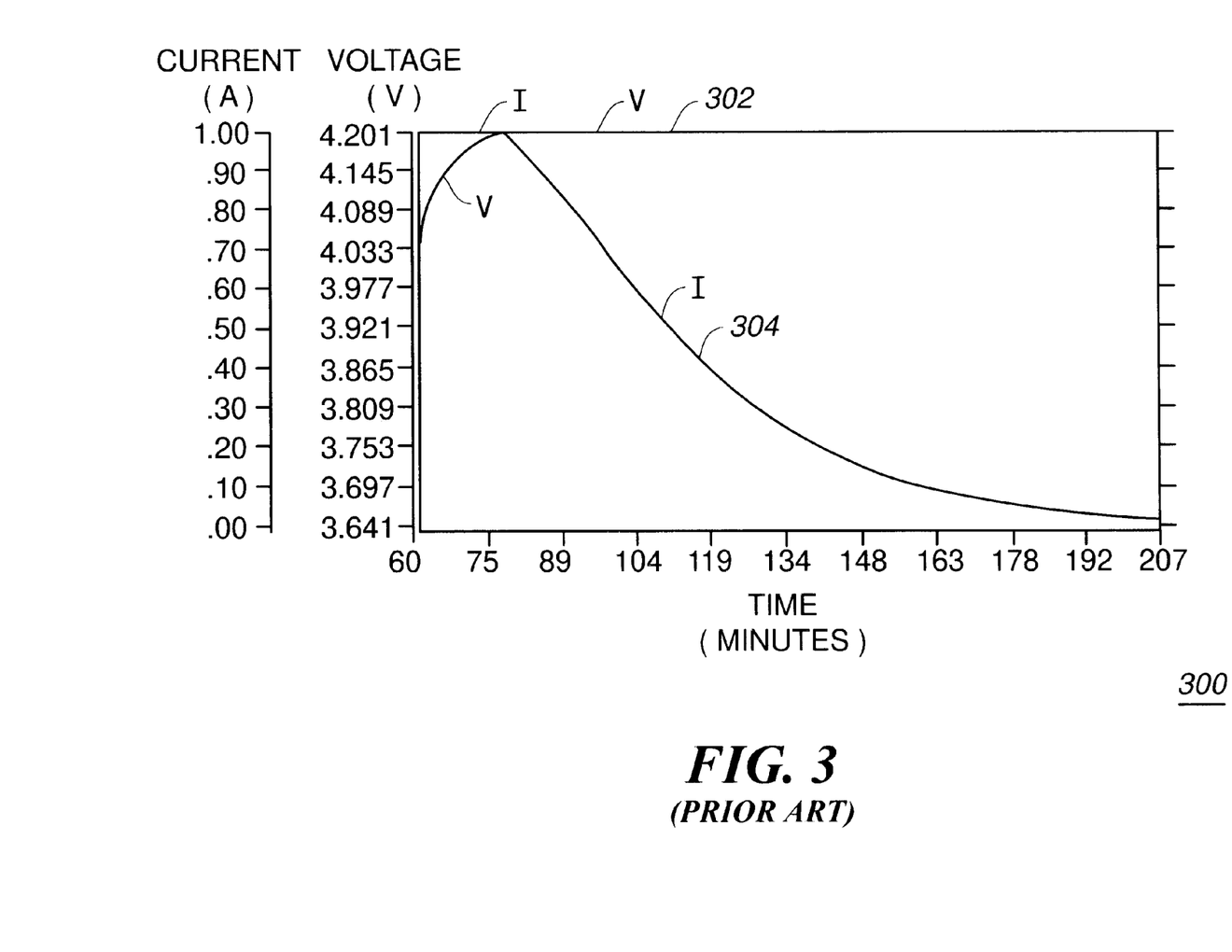
FIGS. 3 and 4 show charging and discharging curves of a battery charged using a prior art charging technique.
Figure 4:
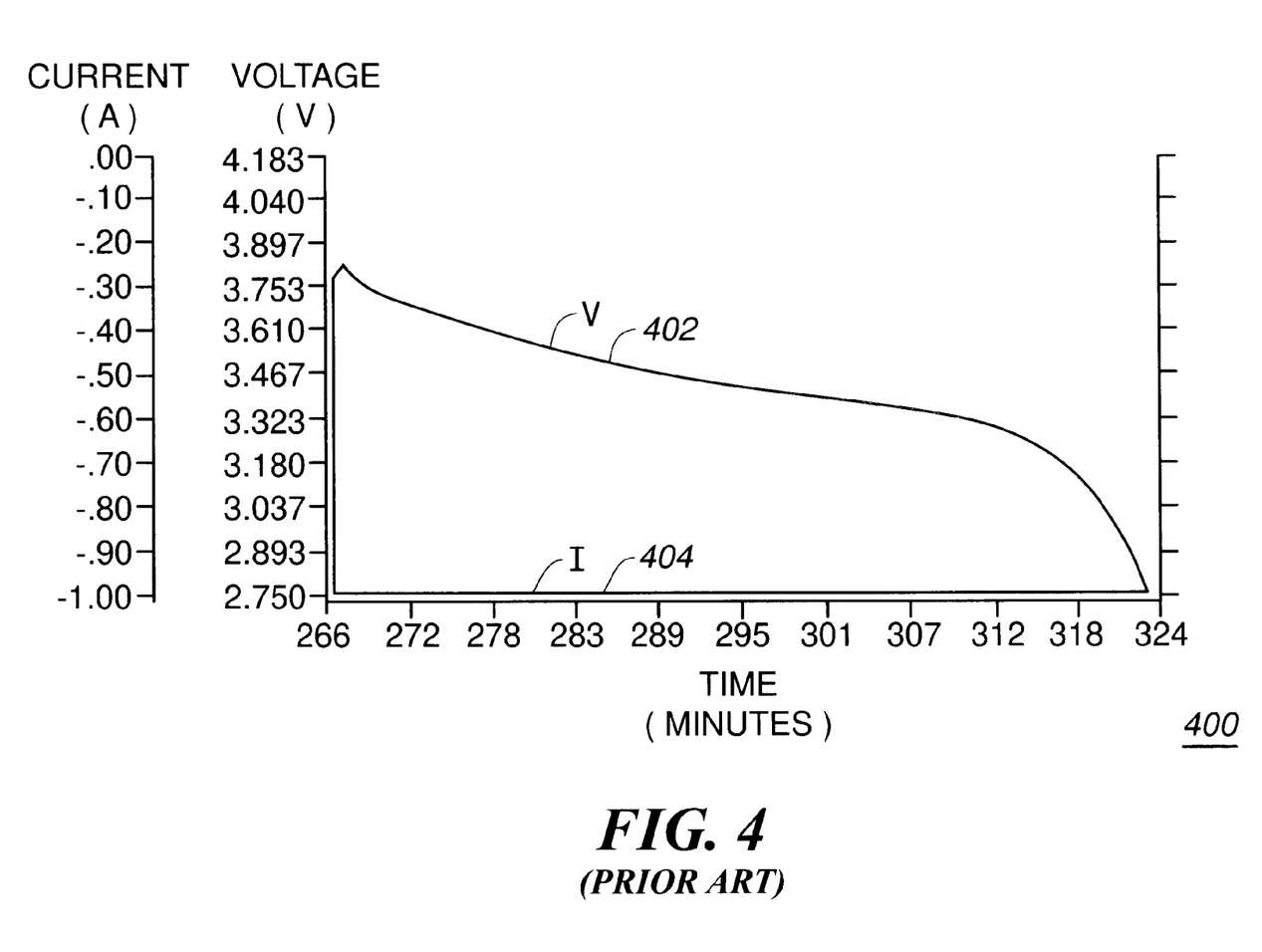

FIGS. 3 and 4 shows charging 300 and discharging 400 curves of a 8 millimeter lithium ion battery using a prior art charging technique. Graph 300 shows the battery being charged to 4.2 volts with the prior art technique of constant current, constant voltage. Designator 302 depicts voltage while designator 304 depicts current. The battery pack was charged with a current (I) of 1 Amp, and a rated internal cell voltage (Vcell) value of 4.2 volts. The charge duration was 2 hours, 25 minutes, and 44 seconds. Graph 400 shows the same battery being discharged with a constant 1 Amp discharge, the battery's capacity was measured to be 944 mAH. Designator 402 depicts voltage while designator 404 depicts current. The discharge time and capacity depicted in graphs 300, 400 are typical for this type of cell.

Figure 5:
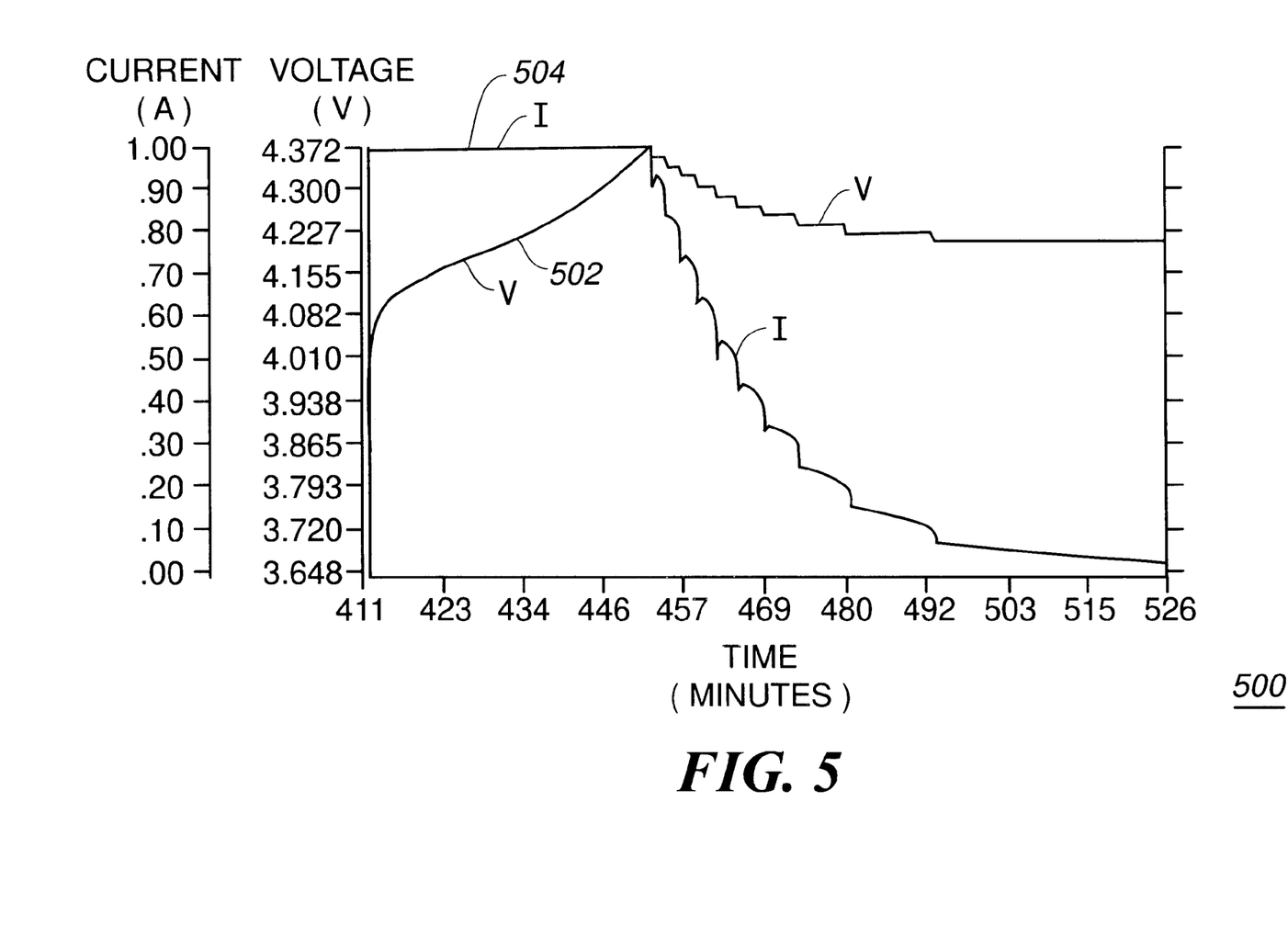
FIGS. 5 and 6 show charging and discharging curves for the same battery charged in accordance with the present invention.
Figure 6:
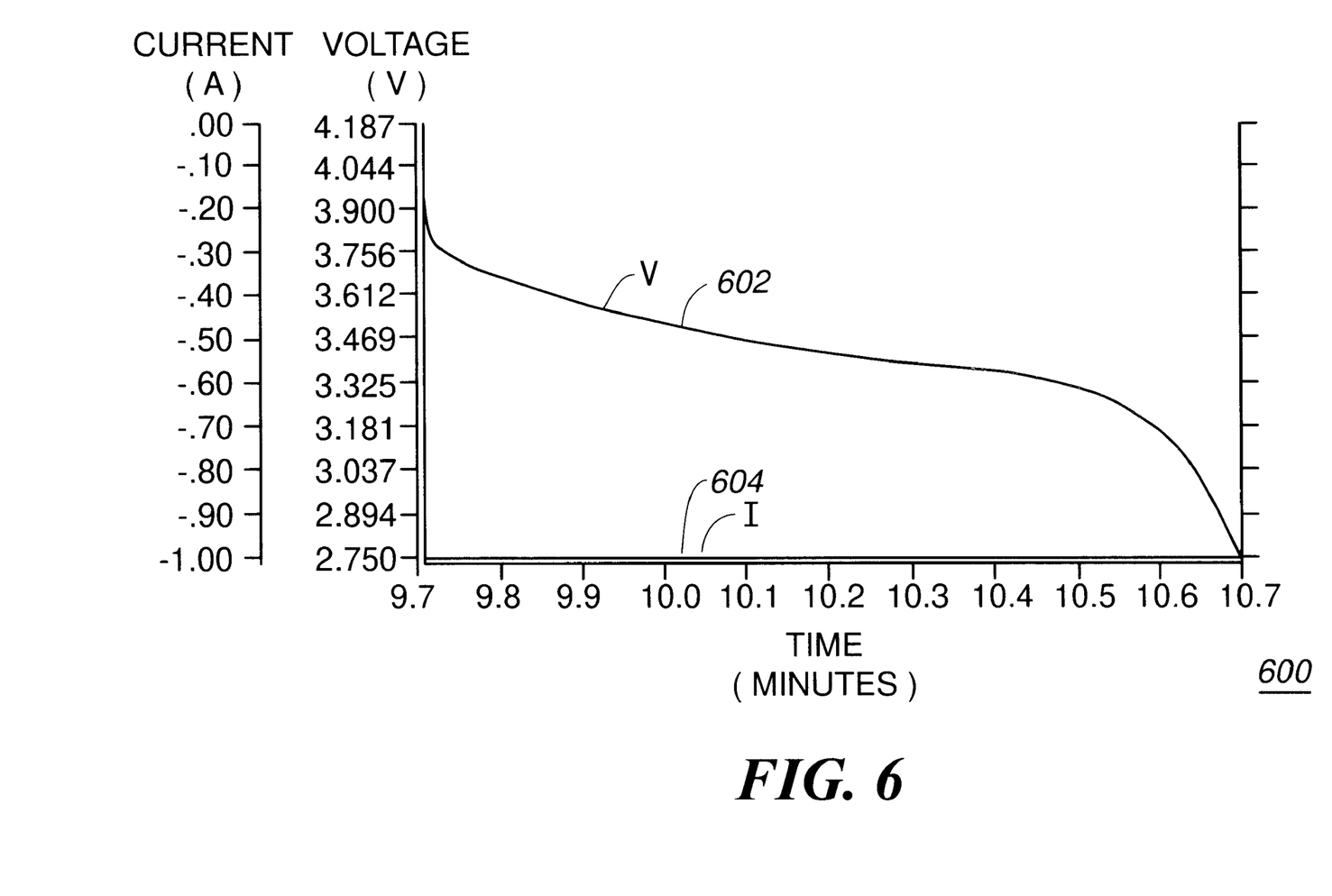

FIGS. 5 and 6 show charging and discharging curves 500, 600 respectively for the same battery charged in accordance with the present invention. Graph 500 shows the voltage 502 and the current 504 for the battery pack being charged to the optimized 4.372 volts with a 1 Amp. The charge current 504 is then cut back in accordance with the invention and the battery pack voltage 502 drops off somewhat accordingly. The internal battery cell voltage, however, would be maintained at approximately the 4.2 volt limit. The charge duration for this battery was 1 hour, 54 minutes, 6 seconds. Referring to graph 600 showing voltage 602 and current 604, the same battery went through a constant 1 Amp discharge. The battery's capacity was measured to be 951 mAH. Thus, this battery charged in accordance with the routine described by the invention was charged approximately 31 minutes and 38 seconds faster while actually achieving slightly higher battery capacity.

Figure 7:
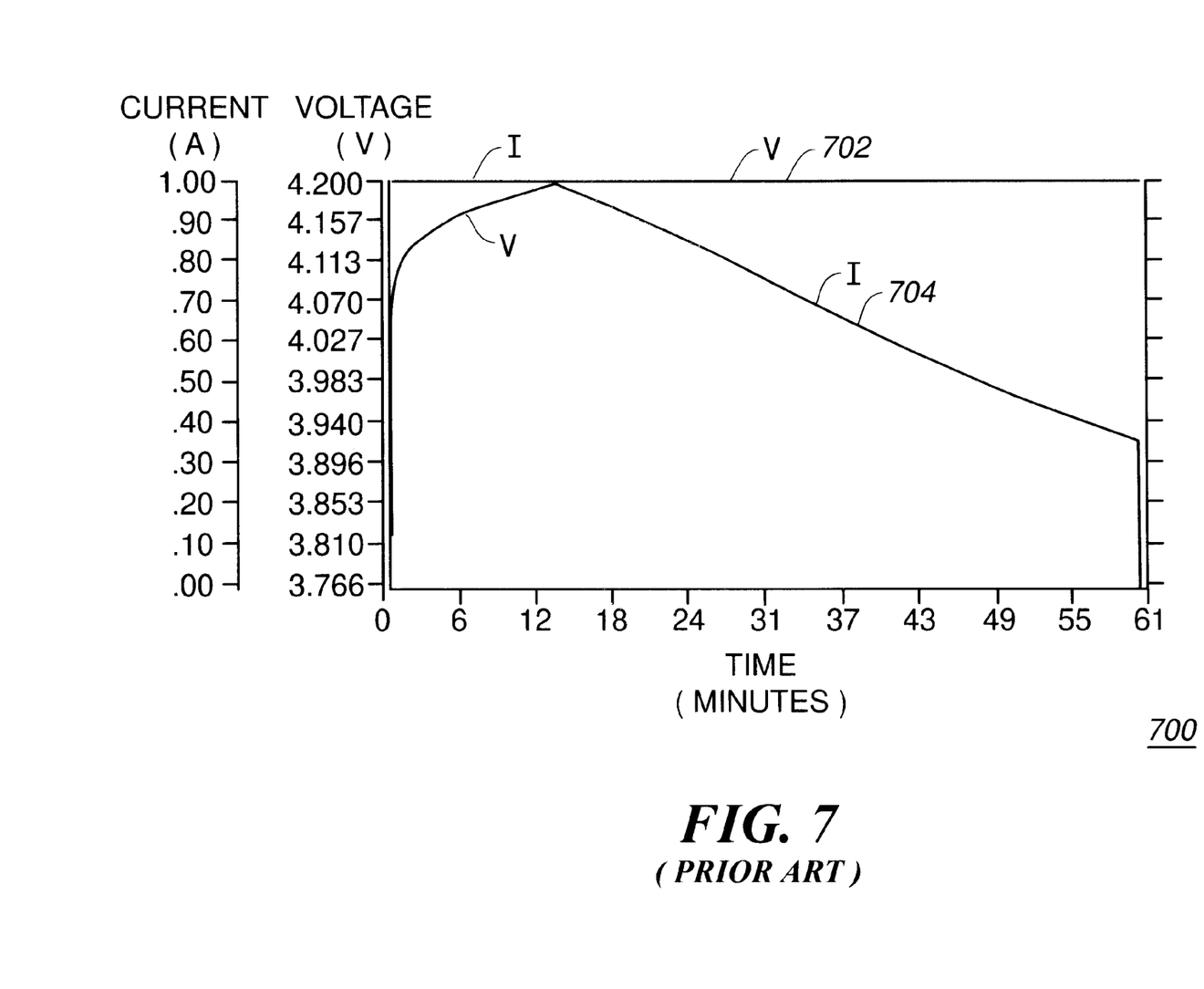
FIGS. 7 and 8 show one hour charge and one hour discharge curves for the battery charged using the prior art charging technique.
Figure 8:
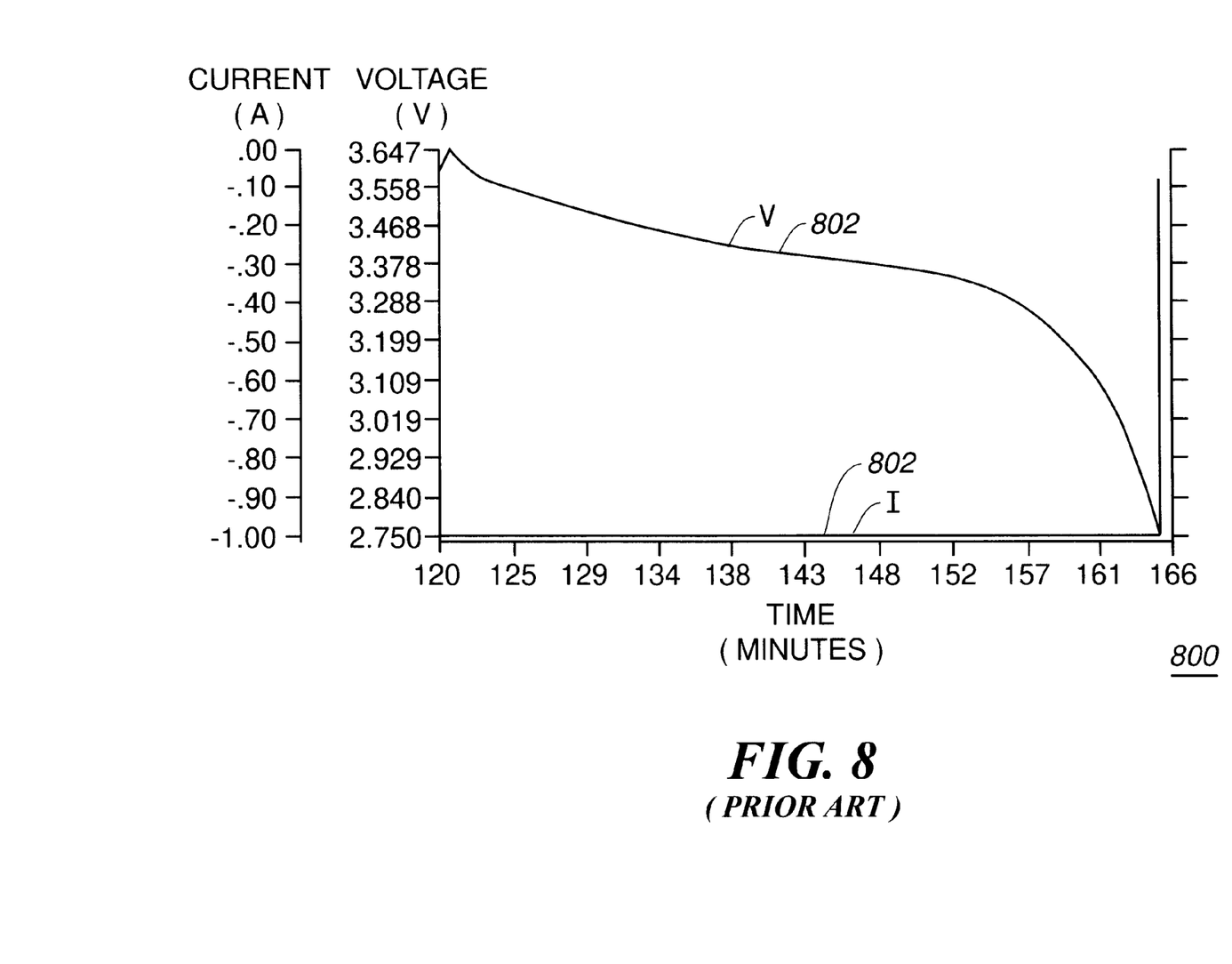

Furthermore, the battery charged in accordance with the invention is charged to approximately 90 percent of its capacity in 1 hour as compared to only 80 percent with the prior art charging routine. FIGS. 7, 8, 9, and 10 depict this increase in charge capacity. FIGS. 7 and 8 show one hour charge and one hour discharge curves 700, 800 respectively for the battery charged using the prior art charging technique. Graph 700 shows the voltage 702 and current 704 for the battery over a 1 hour time frame. Graph 800 shows the voltage 802 and the current 804 while the battery was discharged with a constant 1 Amp load. The battery's capacity measured 751 mAH or 79 percent.

Figure 9:
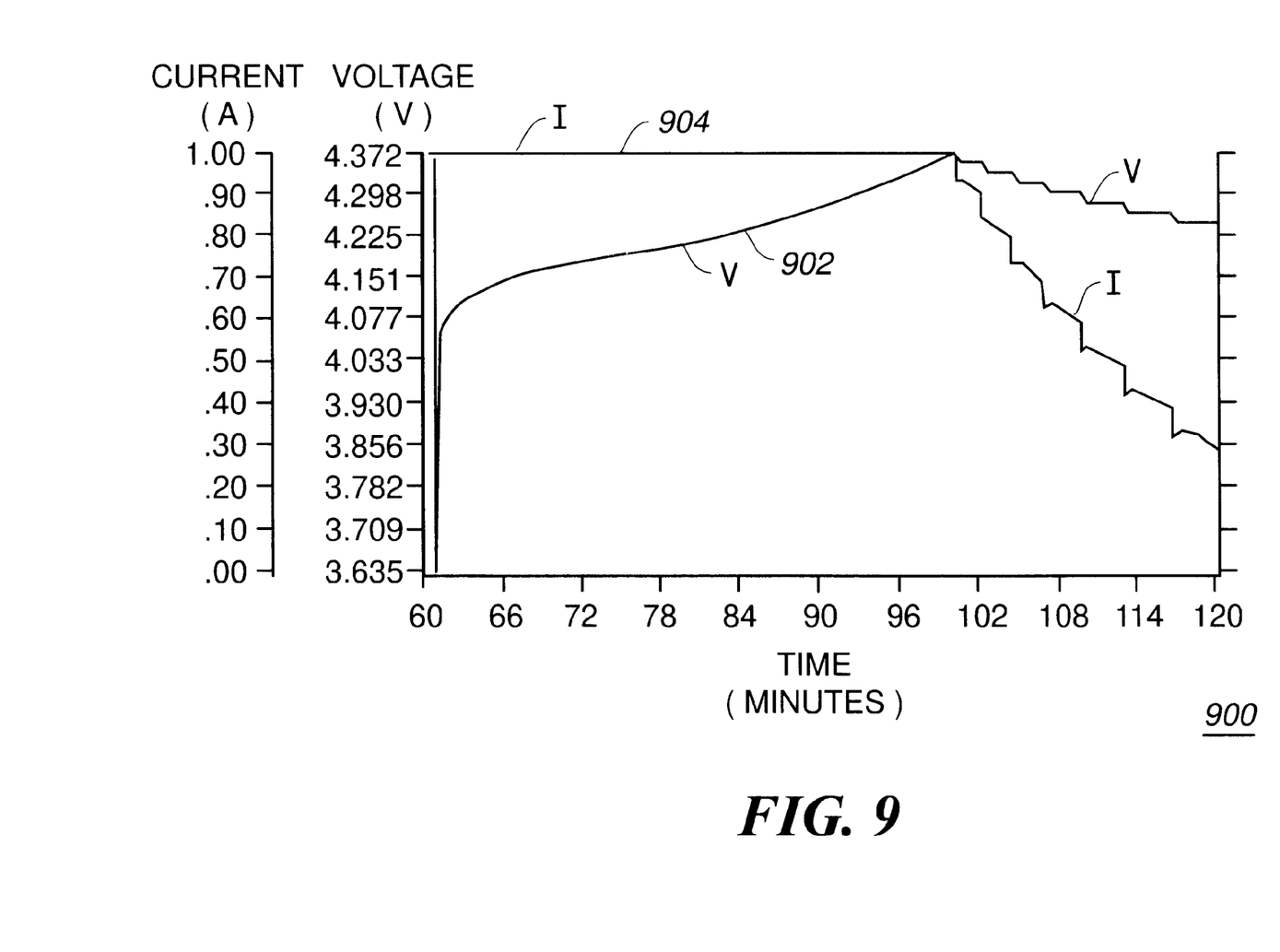
FIGS. 9 and 10 show one hour charge and discharge curves for the same battery charged in accordance with the charging technique of the present invention.
Figure 10:
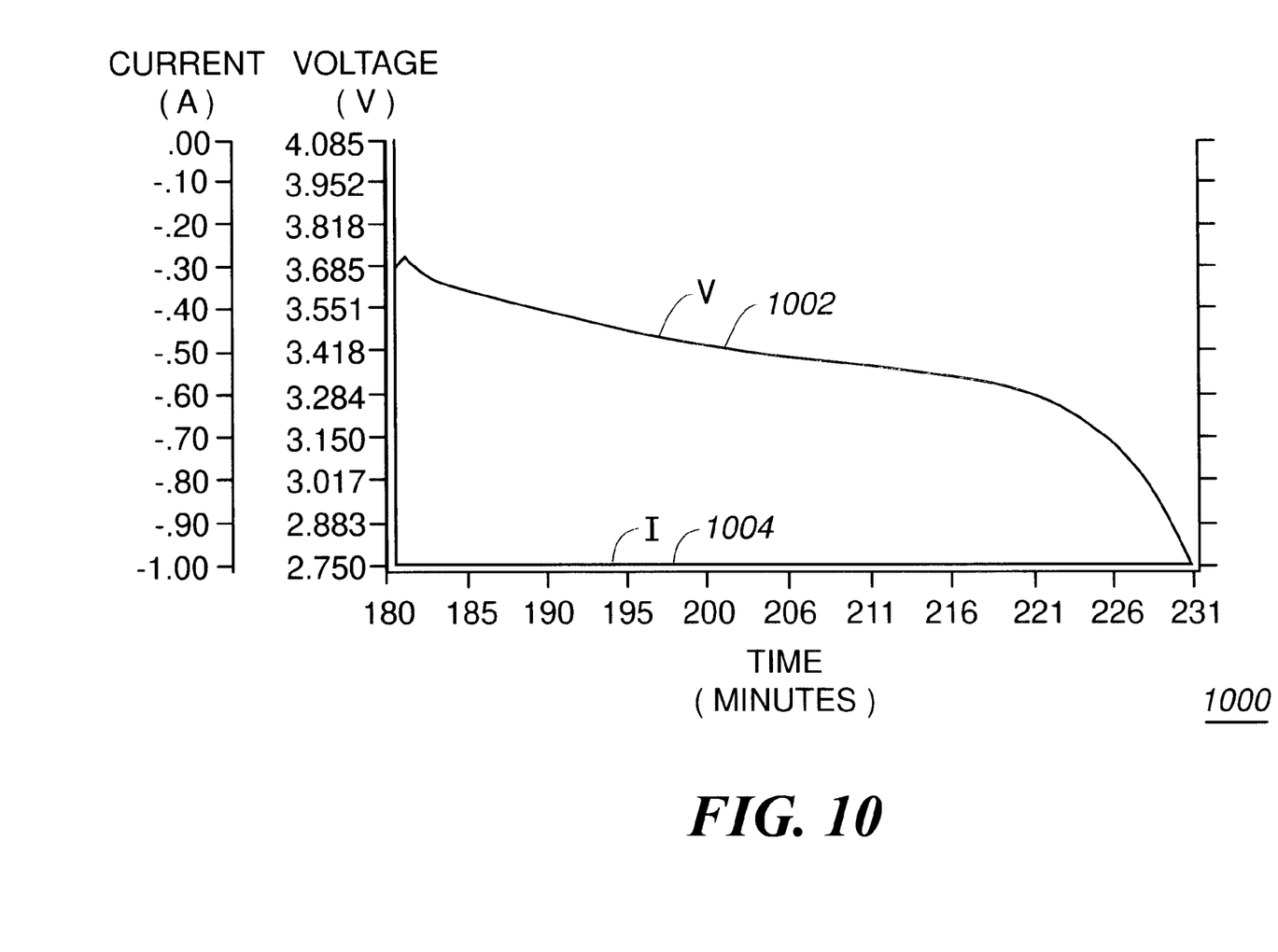

FIGS. 9 and 10 show one hour charge and discharge curves 900, 1000 respectively for the same battery which was charged in accordance with the charging technique of the present invention. Graph 900 the voltage 902 and the current 904 over a 1 hour time frame. Graph 1000 shows the voltage 1002 and current 1004 for the same battery being discharged with a constant 1 amp load. The battery's capacity measured 841 mAH or 89 percent.

The charging method described by the invention is beneficial to charging systems which utilize characteristic constant current/constant voltage charging, such as lithium battery charging systems. By compensating the optimum pack value for the extra impedances in the battery pack, the internal cell voltage can now be maintained closer to its rated voltage. The implementation of the charge routine described by the invention is accomplished without additional circuitry to either the battery or charger making its implementation advantageous in terms of manufacturing and cost.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for charging a battery pack having internal battery cells characterized by a rated cell voltage, rated charge current, and the battery pack also having battery pack circuitry, including the steps of:

determining an impedance value of the battery pack circuitry; and calculating an optimum pack voltage for the battery pack based on the determined impedance value of the battery pack circuitry, the rated charge current, and the rated cell voltage; and charging the battery pack with the rated charge current until the optimum pack voltage is reached.

2. The method of claim 1, wherein the step of determining an impedance value of the battery pack circuitry includes the steps of:

storing predetermined battery circuitry impedance versus temperature information in the battery pack;

measuring the battery pack temperature; and determining the battery pack circuitry impedance based on the measured temperature and the stored predetermined battery circuitry impedance versus temperature information.

3. A method of charging a battery pack having internal battery cells and battery pack circuitry, including the steps of:

storing a maximum charge current, minimum charge current, rated cell voltage, and characteristic battery pack circuitry impedance over temperature;

measuring the battery pack temperature;

determining an impedance value of the battery pack circuitry based on the measured temperature and the stored characteristic battery pack circuitry impedance over temperature;

calculating an optimum pack voltage value for the battery pack based on the maximum charge current, the determined impedance value, and the stored rated cell voltage; and charging the battery with the maximum charge current until the battery pack reaches the optimum pack voltage value.

4. The method of claim 3, wherein the step of charging further includes the steps of:

re-measuring the temperature of the battery pack;

updating the battery pack impedance value based on the temperature and the stored characteristic battery pack circuitry impedance over temperature;

updating the optimum pack voltage value based on the updated battery pack impedance value, charge current, and stored rated cell voltage;

measuring the battery pack voltage;

comparing the battery pack voltage to the updated optimum pack voltage value; and repeating the steps of re-measuring through comparing until the battery pack voltage equals or exceeds the updated optimum pack voltage value.

5. The method of claim 4, further comprising the steps of:

reducing the charge current by a predetermined amount once the battery pack voltage reaches or exceeds the updated optimum pack voltage value;

comparing the reduced charge current to the stored minimum charge current;

returning to the step of repeating when the reduced charge current exceeds the stored minimum charge current; and terminating the charge once the reduced charge current is less than or equal to the stored minimum charge current.

6. The method of claim 4, wherein the step of calculating occurs in a charger.

7. A method for charging a battery pack having internal battery cells and battery pack circuitry, comprising the steps of:

storing a maximum rated charge current, rated cell voltage, and characteristic battery circuitry impedance information over temperature;

measuring the battery pack temperature;

determining an impedance value of the battery pack circuitry based on the measured temperature and the stored characteristic battery circuitry impedance information over temperature;

calculating an optimized charge voltage value based on the stored internal battery cell voltage, the determined impedance value of the battery pack circuitry, and the maximum rated charge current;

begin charging the battery pack with the maximum rated charge current;

measuring the battery pack voltage;

comparing the measured battery pack voltage to the calculated optimized charge voltage value;

reducing the charge current once the battery pack voltage reaches the optimized voltage value; and terminating the charge once the charge current reaches a predetermined minimum threshold.

8. The method of claim 7, wherein the step of comparing the measured battery pack voltage includes the steps of:

re-measuring the temperature;

updating the battery pack circuitry impedance based on the re-measured temperature; and updating the optimized charge voltage value based on the updated battery pack circuitry impedance.

9. The method of claim 8, wherein the step of reducing the charge current further includes the steps of:

comparing the reduced charge current to the minimum threshold; and returning to the step of re-measuring the temperature when the reduced charge current is greater than the minimum threshold.

10. The method of claim 7, wherein the internal battery cells are characterized by a rated cell voltage and the step of calculating includes the step of multiplying the maximum rated charge current by the determined impedance value of the battery pack circuitry and adding it to the rated cell voltage.

* * * * *